United States Patent [19]

Rettig et al.

[11] 4,260,172

[45] Apr. 7, 1981

[54] IMPLEMENT TRANSPORT SYSTEM

[75] Inventors: Vernon E. Rettig, Bondurant; John R. Myers, Polk City, both of Iowa

[73] Assignee: Deere & Company, Moline, Ill.

[21] Appl. No.: 51,302

[22] Filed: Jun. 22, 1979

[51] Int. Cl.³ .............................................. B60D 1/14
[52] U.S. Cl. ................................. 280/411 A; 172/240; 172/313; 172/625
[58] Field of Search ........... 280/411 R, 411 A, 411 C, 280/412, 413, 415 R, 415 A, 462, 468; 172/240, 248, 310, 313, 677, 625; 111/53, 54, 59, 60

[56] References Cited

U.S. PATENT DOCUMENTS

| | | | |
|---|---|---|---|
| 3,532,173 | 10/1970 | Johnson | 280/411 A |
| 3,610,661 | 10/1971 | Pierce | 280/415 R |
| 3,913,683 | 10/1975 | Olsson | 172/240 |
| 4,119,329 | 10/1978 | Smith | 280/415 R |

OTHER PUBLICATIONS

Erskine-Trans-System-Automatic, 3/1979.
Haybuster-Tandem Hitch, 4/1979.
Frontier Inc.-F.A.S.T., 3/1979.
Apollo-Hydraulic Transport System, Big Farmer Magazine, 1/1978.

Primary Examiner—John A. Pekar

[57] ABSTRACT

An implement hitch for ganging multiple implements and towing them forwardly in a field-working position and endwise in a transport position. Trusses extend between hitch assemblies on the implements to provide endwise spacing of the implements. Stabilizers extend rearwardly from the trusses to the front of the implements to maintain the proper fore-and-aft alignment while allowing the implements to move up and down freely over uneven terrain. A main beam pivotally connected to an outermost truss serves as a common link between a towing vehicle and the hitch assembly for both the field-working and transport positions. Transport wheel assemblies mounted near the rear of the implements are provided for raising and lowering the implements to and from the transport position. The inner transport wheel assemblies include means for automatically connecting the adjacent corners of adjacent implements together as they are raised. As the implements are lowered to the field-working position the adjacent corners are automatically disconnected so the implements can move vertically freely with respect to each other.

35 Claims, 11 Drawing Figures

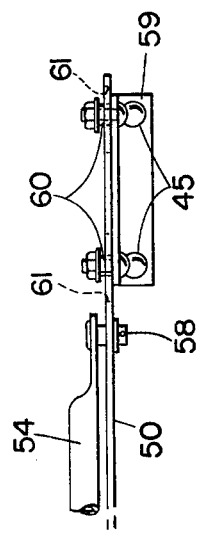
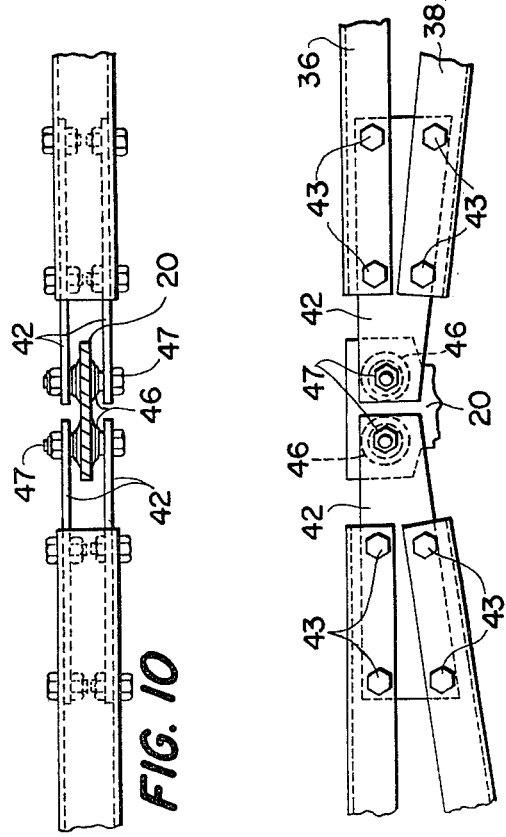
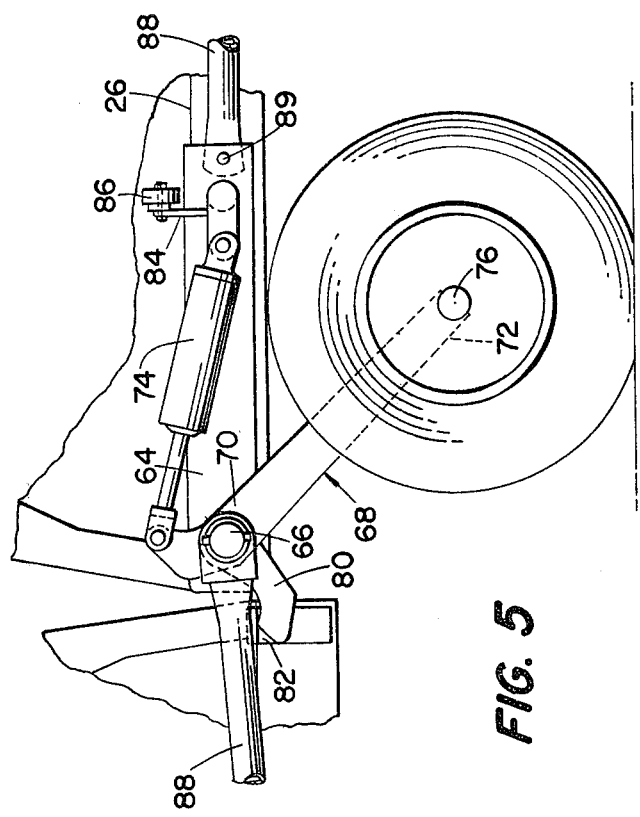
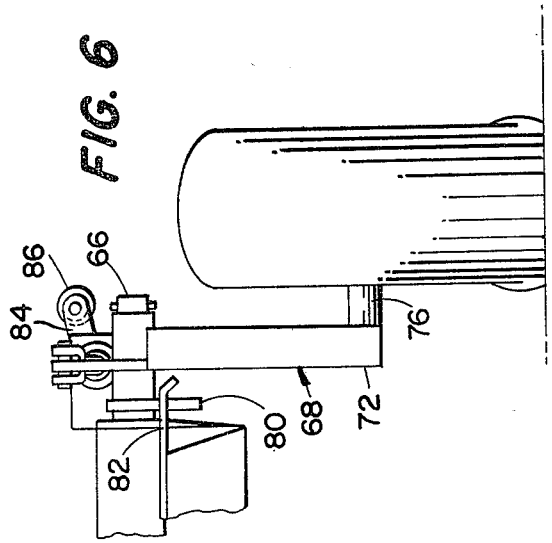

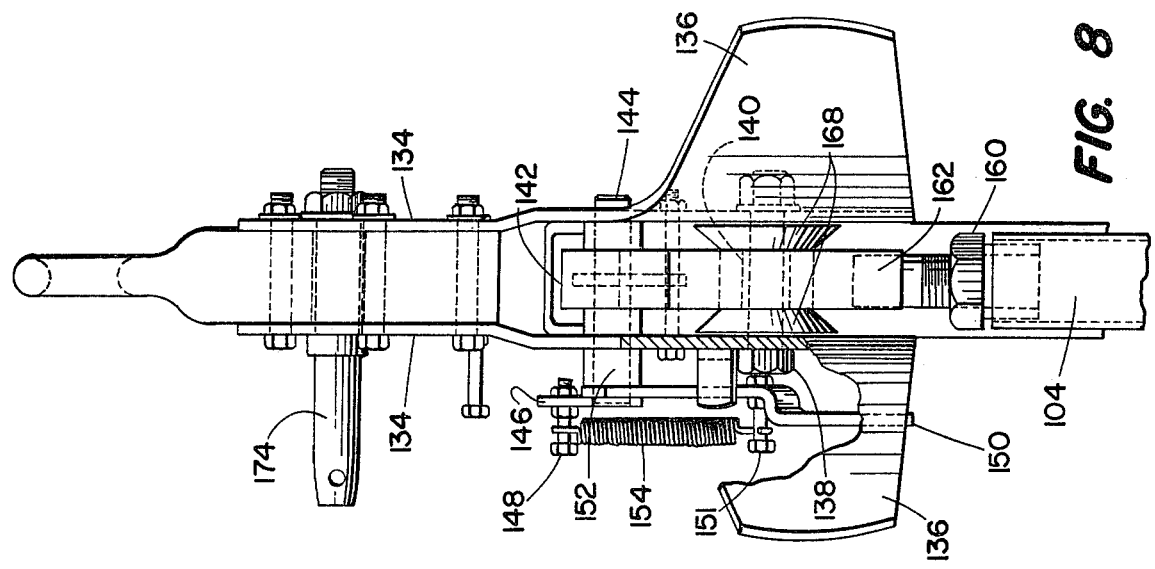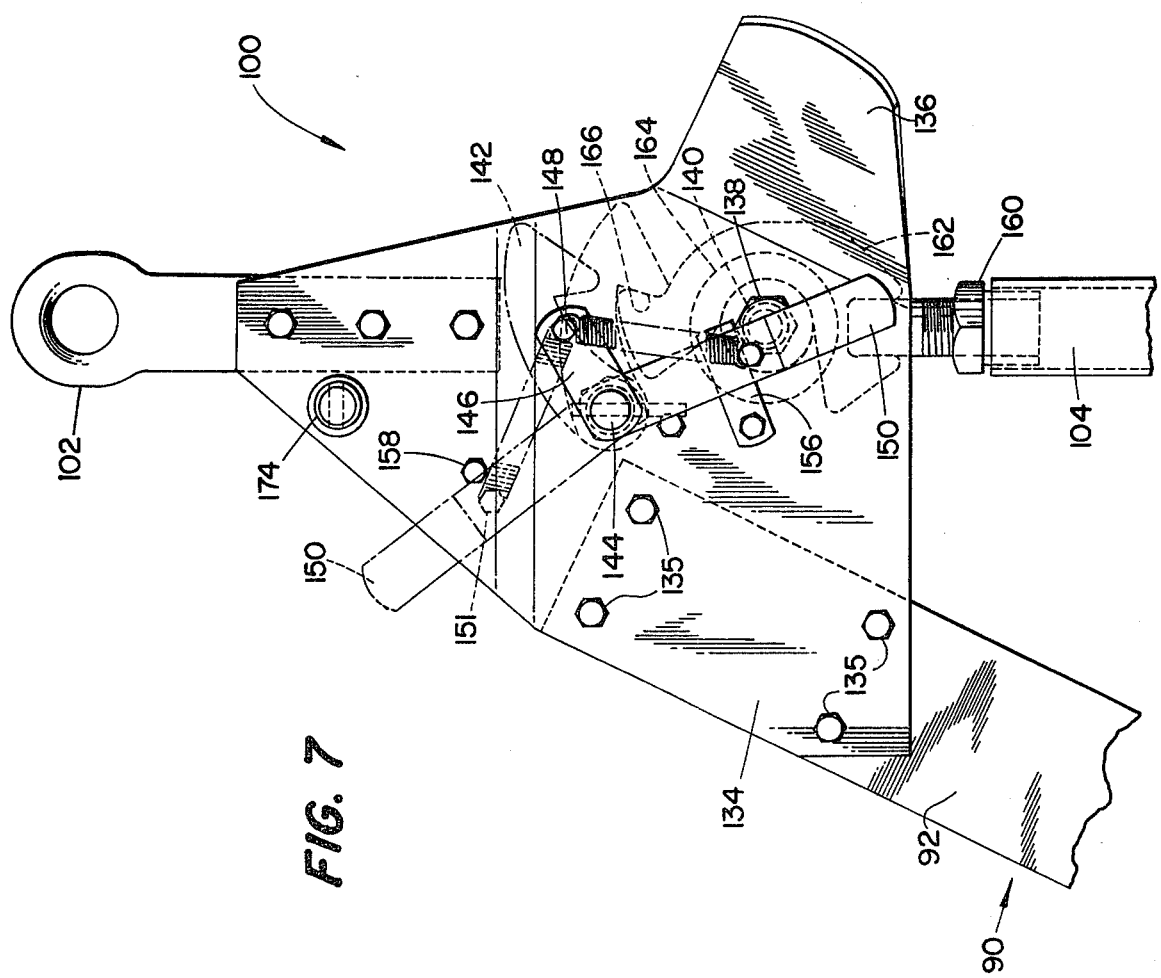

IMPLEMENT TRANSPORT SYSTEM

BACKGROUND OF THE INVENTION

The present invention relates generally to a hitch and more specifically to a hitch for multiple implements which can be converted between an endwise transport position and a forward field-working position.

Farm implements have been made wider to take advantage of increased tractor power and to reduce time in the field. Often two or more implements such a grain drills are ganged and pulled in side-by-side relationship forwardly through the field to plant a wide swath. The forward field-working width of the ganged implements is too great to allow convenient transportation over roads or through narrow gates or the like. Therefore during transportation the implements are often disconnected from the gang and hitched one behind the other so they can be towed in a line to reduce the overall transport width to that of a single implement. Such rearrangement of implements is time-consuming and can require the help of more than one person.

Another way to convert the implements from a field-working to a transport position is to allow the implements to remain in a side-by-side relationship and raise them on transport wheels having fore-and-aft axes of rotation so the implements can be towed endwise. For example, when ganged grain drills are to be transported, rear transport wheels are provided to raise the drills off the ground, while front caster wheels located near the hitch or gooseneck of each drill support the front of the drills. Either a separate drawbar for endwise towing is provided near one end of the implements such as shown in U.S. Pat. Nos. 3,913,683 and 3,610,661, or the main hitch connection can be pivoted from a forward field-working position to an end towing position such as shown in U.S. Pat. No. 4,119,329. Some devices presently available allow the hitch to be changed between the field-working and the transport position without disconnecting the towing vehicle.

Several drawbacks exist in the transport systems typical of the prior art. Some are very massive and relatively inflexible, as a result of one or more large beams extending nearly the entire width of the ganged implements to receive the individual implement hitches. Many require the implements to be hinged or otherwise connected at their adjacent ends while in the field-working position thereby reducing the flexibility of the overall gang and resulting in added stresses and uneven planting or soil working in uneven ground. Generally two rear transport wheels are required for each implement in the gang so that the gang can be raised to a uniform height and adequately supported above the ground in the transport position. An individual hydraulic cylinder must be provided for each wheel assembly, or a linkage assembly connected to a cylinder and to a pair of the wheels is necessary. Therefore when several implements are ganged the number of rear transport wheels and the associated number of hydraulic cylinders and linkages significantly add to the complexity, weight and cost of the hitch. In devices such as shown in the aforementioned U.S. Pat. No. 3,610,661 which use a single transport wheel between pairs of implements, a hinge connection is necessary which limits the flexibility of the gang.

SUMMARY OF THE INVENTION

It is therefore an object of the present invention to provide an improved hitch for multiple implements which overcomes the aforementioned problems. It is still another object of the invention to provide an improved hitch for towing several implements forwardly in a field-working position and endwise in a transport position which does not have to be disconnected from the towing vehicle when changing from one of the positions to the other.

It is yet another object to provide an improved hitch with decreased weight and increased flexibility for pulling multiple implements forwardly through a field to cover a wide swath which can be quickly converted for transporting the implements in an endwise fashion.

It is another object of the invention to provide a hitch assembly for multiple implements which can be easily converted from a forward field-working position to an endwise transport position and which requires relatively few rear transport wheels for lifting the implements to and carrying them in the transport position.

It is still another object of the present invention to provide an improved hitch assembly which is convertible between a field-working and a transport position, and which is relatively strong and flexible, and which does not require a massive frame.

In accordance with the above, a hitch is provided with a plurality of truss members extending substantially transversely to the forward towing direction, each member connected between the hitch assemblies for a pair of adjacent implements for transversely spacing the implements in the desired side-by-side fashion. Pairs of pivotally connected stabilizers extend rearwardly from the truss members to adjacent front corners of the implements to maintain fore-and-aft alignment of the implements while allowing them to move freely up and down with respect to each other over uneven terrain. The main hitch beam which is connected to a towing vehicle is pivotally connected to an endmost truss member for pivoting between a forwardly extending working position for pulling the implements through the field and an endwise extending transport position wherein the hitch beam extends outwardly beyond the endmost implement. A hydraulically operated rear lift wheel assembly is connected to one end of the adjacent corners of a pair of implements and includes a cam which is raised as the wheel is lowered to lift the implement. The cam engages a lift bracket on the adjacent corner to prevent it from remaining below the level of the cam. Therefore only a single lift wheel assembly is required to raise a pair of adjacent implement corners to the same height. In addition when the implements are lowered to the field-working position, the cam pivots away from the bracket so that the individual implements are free to move up and down with respect to each other over uneven terrain.

These and other objects, advantages and features of the present invention will become apparent from the description which follows and from the drawings. Although the present invention will be described in the embodiment of a hitch for multiple grain drills, it will be apparent to one skilled in the art that the hitch can be used for other implements as well.

BRIEF DESCRIPTION OF THE DRAWINGS

FIG. 5 is an elevation of a rear transport wheel assembly showing the operation of the lift bracket and cam arrangement as the transport wheel lifts the corners of adjacent implements;

FIG. 6 is an end view of the transport wheel assembly shown in FIG. 5;

FIG. 7 is a plan view of the latch assembly;

FIG. 8 is a side view of the assembly shown in FIG. 7;

FIG. 9 is a plan view of the end portions of an adjacent pair of trusses connected to an implement hitch;

FIG. 10 is a front view of the connection in FIG. 9 and showing the ball joints connecting the hitch and the trusses; and FIG. 11 is a top view of the forward portion of one of the stabilizers connected between the trusses and the implements.

DESCRIPTION OF THE PREFERRED EMBODIMENT

Figure 1:
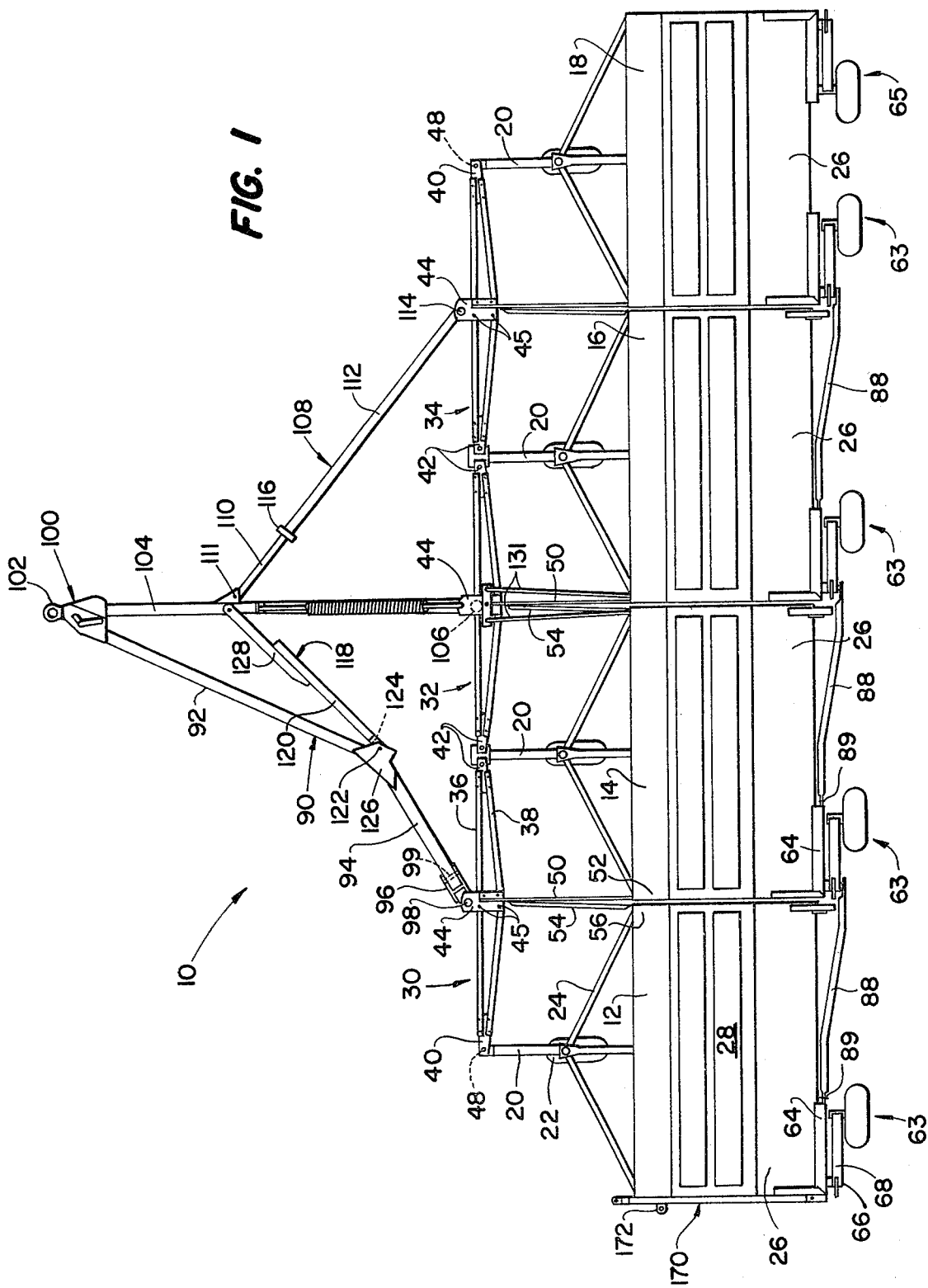
FIG. 1 is a plan view of the hitch of the present invention towing four grain drills in the field-working position.

Referring now to FIG. 1, there is shown a hitch assembly indicated generally at 10 connected to four grain drills 12, 14, 16, and 18. Each drill includes a hitch assembly or gooseneck 20 and a caster wheel 22 supported forwardly of the drill by a frame 24. A rear frame member or footboard 26 is provided behind a seed grain hopper 28 which feeds conventional disk openers or the like (not shown). The openers are raised and lowered in a conventional manner by hydraulic cylinders 29 (FIG. 4) connected through linkages to rockshafts under the frames.

Connected between adjacent pairs of the drills are truss members 30, 32, and 34. Each truss member has a generally straight forward beam 36 and a rear beam 38 angled slightly forwardly from its center. The beams 36 and 38 are U-shaped and are connected near their end portions by horizontal brackets 40 and 42 and bolts 43 (FIG. 9). The center portions of the beams 36 and 38 are connected to a forwardly extending bracket 44 by four bolts 45. The hitches 20 on the inner drills 14 and 16 carry ball joints 46 (FIG. 10). Bolts 47 extend through holes in the brackets 42 and the ball joints 46 to connect the trusses to the hitches 20. Similar ball joints 48 connect the hitches 20 on the outer drills 12 and 18 to the outer ends of the trusses 30 and 34, respectively. The ball joints allow the three trusses 30, 32 and 34 to move up and down out of horizontal alignment as the hitches 20 move vertically with respect to each other, eliminating problems of planting depth variations and hitch frame stresses in uneven ground.

A stabilizer bar 50 is connected between the center portion of each truss and the front corner 52 of a corresponding implement. A stabilizer tube 54 has one of its ends connected to the adjacent corner 56 of the next implement. The opposite end of the tube 54 is connected for pivoting about a pin 58 (FIG. 11) which extends through the stabilizer bar 50 just behind the truss. The stabilizer bars 50 for the truss members 30 and 34 are connected to the corresponding truss by an angle iron bracket 59 and a pair of spacers 60 bolted onto the bracket. The bracket 59 is mounted on the top of the bracket 44 by two of the bolts 45. A pair of fore-and-aft extending slots 61 in the stabilizer bar 50 allow it to move back and forth with respect to the spacers 60 so that normally there is no draft loading transmitted to the drill corners by the stabilizer bars. Essentially all of the draft loading is therefore carried by the drill hitches 20. The stabilizer bars 50 also maintain the trusses 30 and 34 in a generally horizontal attitude so that the beams 36 and 38 remain at approximately the same height. The tube 54 and bar 50, which are pivotally connected to the drill corners, are long enough that as they pivot with respect to each other about the pin 58 to allow the adjacent corners of the drills to move freely up and down they still maintain the corners 52 and 56 in substantial fore-and-aft alignment.

At the left rear corner of each grain drill in the gang of drills there is provided a transport wheel assembly 63 including a transport frame 64 connected to the footboard 26 of the drill. A similar transport wheel assembly 65 is connected to the outermost end of the drill 18. A generally horizontal pivot 66 extends rearwardly from the frame 64. A transport leg 68 (FIG. 5) having upper and lower ends 70 and 72 is connected for rocking about the pivot 66 in a generally vertical plane extending in a direction transverse to the forward direction of travel of the implements in the field. A hydraulic cylinder 74 has its rod end connected to the upper end of the transport leg and its opposite end anchored to the transport frame 64. The lower end 72 of the leg 68 carries an axle 76 extending generally in the fore-and-aft direction and rotatably mounting a transport wheel 78.

On the inside three transport wheel assemblies 63, a cam 80 is connected for rocking with the leg 68. As the wheel 78 is lowered the cam extends outwardly beyond the corner of the corresponding grain drill and beyond the plane of the side of the adjacent grain drill. The adjacent grain drill carries a lift bracket 82 which extends rearwardly into the plane of rotation of the cam 80. As is evident from FIG. 5, as the hydraulic cylinder 74 is retracted, the transport leg 68 and the cam 80 rotate in the clockwise direction about the pivot 66, and the cam 80 contacts the lift bracket 82 thereby raising the adjacent corner of the next drill. With the hydraulic cylinder 74 fully retracted, the drill corners are lifted completely off the ground in a transport position and the cam 80 is positioned such that the adjacent drill frames are at the same height. As the hydraulic cylinder is extended to lower the drills to the field-working position, the cam 80 pivots away from the lift bracket 82 so that the adjacent drill corners are free to move up and down with respect to each other over uneven ground.

A bracket 84 connected to the transport frame 64 carries a roller 86 having an axis of rotation transverse to the axis of rotation of the transport wheel 78. As the hydraulic cylinder is extended and the transport wheel is lifted above the footboard 26 the roller 86 contacts the side wall of the wheel 78. The roller 86 therefore holds the transport wheel against rotation when in the upper field-working position.

Tie bars 88 are pivotally connected at one end to the pivot 66 of one implement and at the other end to a fore-and-aft extending pivot pin 89 on the transport frame 64 on an adjacent implement. The tie bars 88 maintain the proper rear spacing on the adjacent pairs of implements while at the same time allowing the implements to move up and down freely with respect to each other. The distance between the pin 89 and the pivot 66 securing the ends of a bar 88 is much larger than the distance the two adjacent implement corners move vertically with respect to each other under normal operating conditions. Therefore the rear transverse spacing between implements is maintained essentially constant. It should be noted here that no front or rear frame member extending substantially the entire width of the ganged implements is necessary, and no fore-and-aft extending beams are provided connecting the front trusses with the rear transport frames 64. Much of the frame support is provided by the individual implements themselves thus reducing the weight, complexity, and cost of the hitch and increasing its flexibility.

A main beam 90 is pivotally connected to the leftmost truss 30 and provides a common link between the drills 12–18 and the towing vehicle in both the forward field-working position and the endwise transport position. The beam 90 includes a forward portion 92 which has an axis which is angled outwardly from the fore-and-aft direction and a rear portion 94 which is angled outwardly with respect to the forward portion. The beam 90 is connected to the forwardly extending bracket 44 on the truss 30 by a beam bracket 96. The bracket 96 is pivotally connected to the bracket 44 by a vertical pivot 98. The beam 90 can also pivot up and down about a pivot pin 99 to provide vertical flexibility.

The forward portion 92 of the beam 90 terminates in a latch assembly 100 (described in detail below) and includes a connection 102 for attaching the beam to a towing vehicle such as a tractor. In the field-working position, a center rod 104 which is pivotally connected by a ball joint 106 to the central truss 32, is connected to the latch assembly 100. A telescoping tube 108 includes an inner rod 110 pivotally connected to the center rod 104 by a universal joint 111 and a outer tube 112 pivotally connected by a ball joint 114 to the forwardly extending bracket 44 on the right-most truss frame 34. The universal joint 111 allows the tube 108 to move either vertically or horizontally with respect to the center rod 104. The inner rod 110 is provided with an aperture (not shown) so that it can be locked with respect to the outer tube 112 in the position shown in FIGS. 1 and 4 by a plunger pin assembly 116.

Pivotally connected to the center rod 104 and to the main beam 90 is a drag link 118. The link 118 includes a rear member 120 connected for pivoting with respect to the main beam 90 by a vertical pin 122 and a horizontal pin 124. A pair of horizontal plates 126 which function as a gusset are located between the forward portion 92 and the rearward portion 94 of the beam extend inwardly beyond the horizontal pivot 124 to nullify its effect and prevent the drag link 118 from pivoting vertically while approaching or in the position shown in FIG. 1. The drag link 118 also includes an upper portion 128 having a U-shaped configuration opening outwardly and forwardly, and a length adjustment (not shown) for manufacturing variations.

A mast 130 extends upwardly from the center truss frame 32 and is stabilized by rods 131. The rods 131 also serve to stabilize the truss frame 32 in a generally horizontal attitude. The stabilizer bar 50 for the center truss 32 is connected in a similar manner as for the trusses 30 and 34 described above, but only a single spacer 60 and a single slot 61 are utilized since the rods 131 rather than the bar 50 keep the truss horizontal. A balance spring 132 is connected to the top of the mast and extends in the direction of the center rod 104 and is connected thereto by a bracket 133 to provide vertical support. The drag link 118 and the spring 132 position the rod 104 with respect to the main beam 90 so that the rod is properly aligned with the latch assembly 100 during the latching operation which will be described in detail below.

The latch assembly 100 (FIGS. 7 and 8) includes a pair of plates 134 connected to the main beam 90 with bolts 135. The plates 134 include a pair of diverging guide members 136. A bolt 138 carries a circular load-carrying post member 140 between the plates 134. Radially offset from the post 140 is a pawl 142 connected for pivoting between the plates 134 to a pin 144. An arm member 146 is connected to the pin 144 and carries a bolt or post 148. A two-position control lever 150 including a post 151 is mounted on a sleeve 152 which can pivot about the pin 144. A spring 154 is connected between the posts 148 and 151. When the lever 150 is in the counterclockwise-most, or latching position against a stop 156, as shown by the solid lines in FIG. 7, the spring 154 biases the arm member 146 in the clockwise direction, urging the pawl 142 toward the post 140. When the lever 150 is in the clockwise-most or unlatching position shown by the dotted lines, the post 151 is shifted to a location ahead of the pivot pin 144 so that the spring 154 urges the arm member 146 along with the pawl 142 in the counterclockwise direction. A stop 158 holds the lever 150 in the unlatching position.

Figure 4:
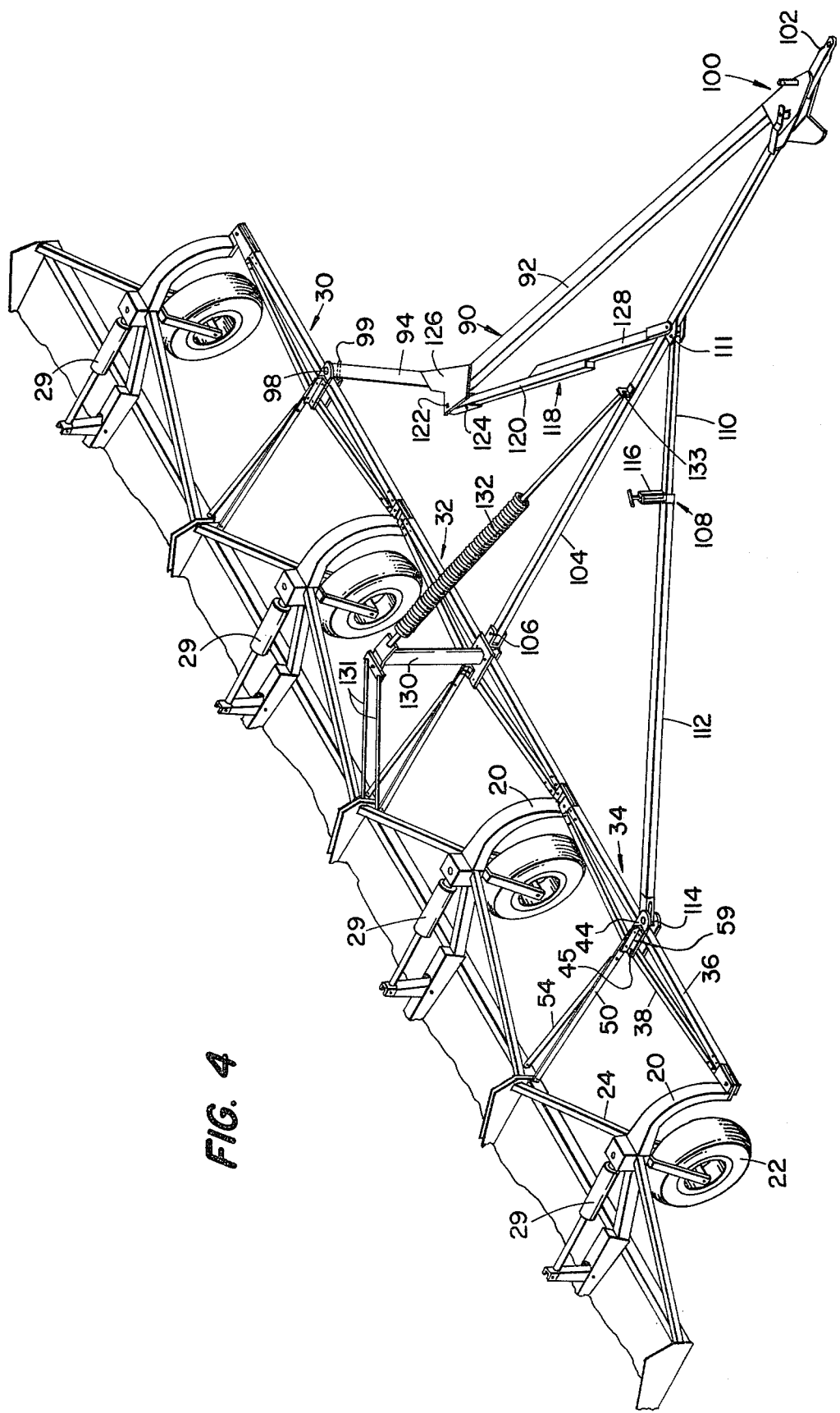
FIG. 4 is a perspective view of a front portion of the hitch shown in FIG. 1.

Connected to the end of the center rod 104 by an adjustable connector 160 is a hook 162 having a generally semicircular center opening 164 with a radius of curvature substantially equal to the radius of the center portion of the post 140. The outer portion of the hook 162 includes an indented or catch portion 166 conforming generally to the shape of the pawl 142. In the field-working position as shown in FIGS. 1 and 4, the hook 162 is positioned against the post 140 and the pawl 142 is biased by the spring 154 into the indented portion 166. The post 140 carries the loading from the rod 104, and no additional pins or other types of connection are needed between the rod and the latch assembly. The diverging guide members 136, and top and bottom portions 168 on the post 140 which are in the shape of truncated cones, help to guide the hook 162 into position as the hitch assembly is changed from the transport to the field-working position.

Figure 2:
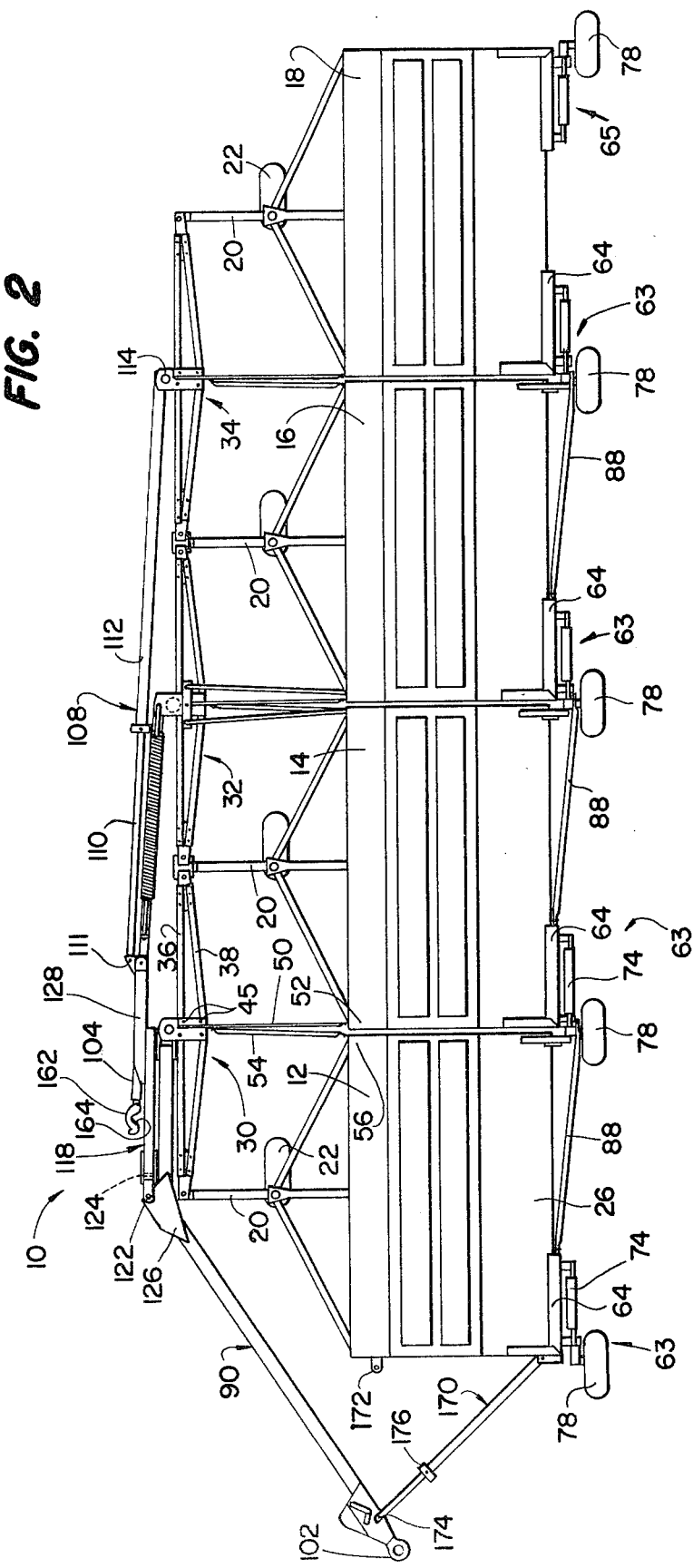
FIG. 2 is a view similar to FIG. 1 but showing the hitch in the endwise transport position.

The procedure for converting the hitch 10 from the field position (FIG. 1) to the endwise transport position (FIG. 2) is as follows. The lever 150 is pivoted to the unlatching position causing the spring 154 to bias the pawl 142 away from engagement with the hook 162. The plunger pin assembly 116 is lifted and turned to prevent the pin from engaging the telescoping tube 108, allowing the inner rod 110 to telescope with respect the outer tube 112. As the towing vehicle moves the main beam 90 forwardly and to the left as viewed in FIG. 1, the hook 152 on the center rod 104 separates from the latch assembly 100. Initailly the telescoping tube 108 is retracted as the drag link 118 pushes the rod 104 to the right. As the beam 90 continues to pivot in the counterclockwise direction, the link 118 pulls the rod 104 to the right and the tube 108 begins to extend with the inner rod 110 sliding outwardly from the outer tube 112. The drag link 118 pulls the rod 104 and the tube 108 counterclockwise about the joints 106 and 114 toward the folded position shown in FIG. 2. The balance spring 132 helps maintain the rod 104 and tube 108 in general horizontal alignment with the main beam 90. As beam 90 approaches the transport position, the towing vehicle is backed to orient the drills substantially endwise to the vehicle.

As the main beam 90 approaches the endwise transport position, the end of the center rod 104 is received by the U-shaped bracket 128 on the drag link 118 to secure the center rod 104 and the telescoping tube 108 against vertical movement during transport. In addition, the horizontal pivot 124 which connects the drag link 118 with the beam 90 pivots out of the reach of the extension on the horizontal plates 126 allowing the connection to rock about the horizontal pivot during transport. The stabilizer bars 50 prevent the forward section of the trusses 30 and 34 from dropping, while the support rods 131 stabilize the center truss 32.

A telescoping transport link 170, which is pivotally connected to the left rear transport wheel assembly frame 64 by a joint similar to that shown at 111 and secured alongside the implement by a storage clip 172 when in the field-working position (FIG. 1), is removed from the clip and swung toward a transport pin 174 located near the hitch connection 102. A plunger pin assembly 176 is released and the transport link 170 is extended so that it can be pinned to the main beam 90 by the transport pin 174. The towing vehicle is then backed up further until the main beam reaches the location shown in FIG. 2 at which time the plunger pin automatically drops into a hole in the transport link to prevent it from telescoping and to secure the beam 90 in the transport position.

After the transport link 170 is positionally secured by the plunger pin assembly 176, the rear of the drills are raised by lowering the transport wheels 78. As the hydraulic cylinders 74, which are connected in parallel, are retracted, the transport legs 68 rotate about their pivots 66 forcing the transport wheels against the ground and raising the rear corners of the drills on which the transport frames 64 are mounted. The cams 80 on the three center wheel assemblies 62 swing out and contact the associated lift brackets 82 on the adjacent drills so that after each hydraulic cylinder is completely retracted, the adjacent drill corners are at the same height. The gang of implements can then be transported endwise on the transport wheels 78 and the caster wheels 22 which pivot 90° from the position shown in FIG. 1. All cylinder hoses are routed along the main beam 90 and remain connected to the towing vehicle while changing between the field-working and transport positions.

To convert the hitch back to the field position as shown in FIG. 1, the above procedure is reversed. The transport link 170 is uncoupled from the main beam 90 and the towing vehicle is driven toward the right so that the main beam pivots 90 toward the forward position. The lever 150 is positioned so that the spring 154 biases the pawl 142 toward the post 140. As the beam 90 reaches the position shown in FIG. 1 the diverging guide members 136 channel the hook 162 carried by the center rod 104 which in turn is floated by the balance spring 132 so that the hook 162 contacts the post 140. The drag link 118 is forced between the horizontal plates 126 on the main beam 90 to provide height control for the center rod 104. The pawl 142 which is biased toward the post automatically engages the portion 166 on the hook to secure the center rod 104 in position. The plunger pin assembly 116 is set to lock the inner rod 110 with respect to the outer tube 112 when the main beam reaches the forward field-working position. Therefore, once the lever 150 and the pin assembly 116 are set and the pawl 142 is loaded to catch the hook, the operator can back the drills into the field position and return to drilling without leaving the seat of the towing vehicle.

Figure 3:
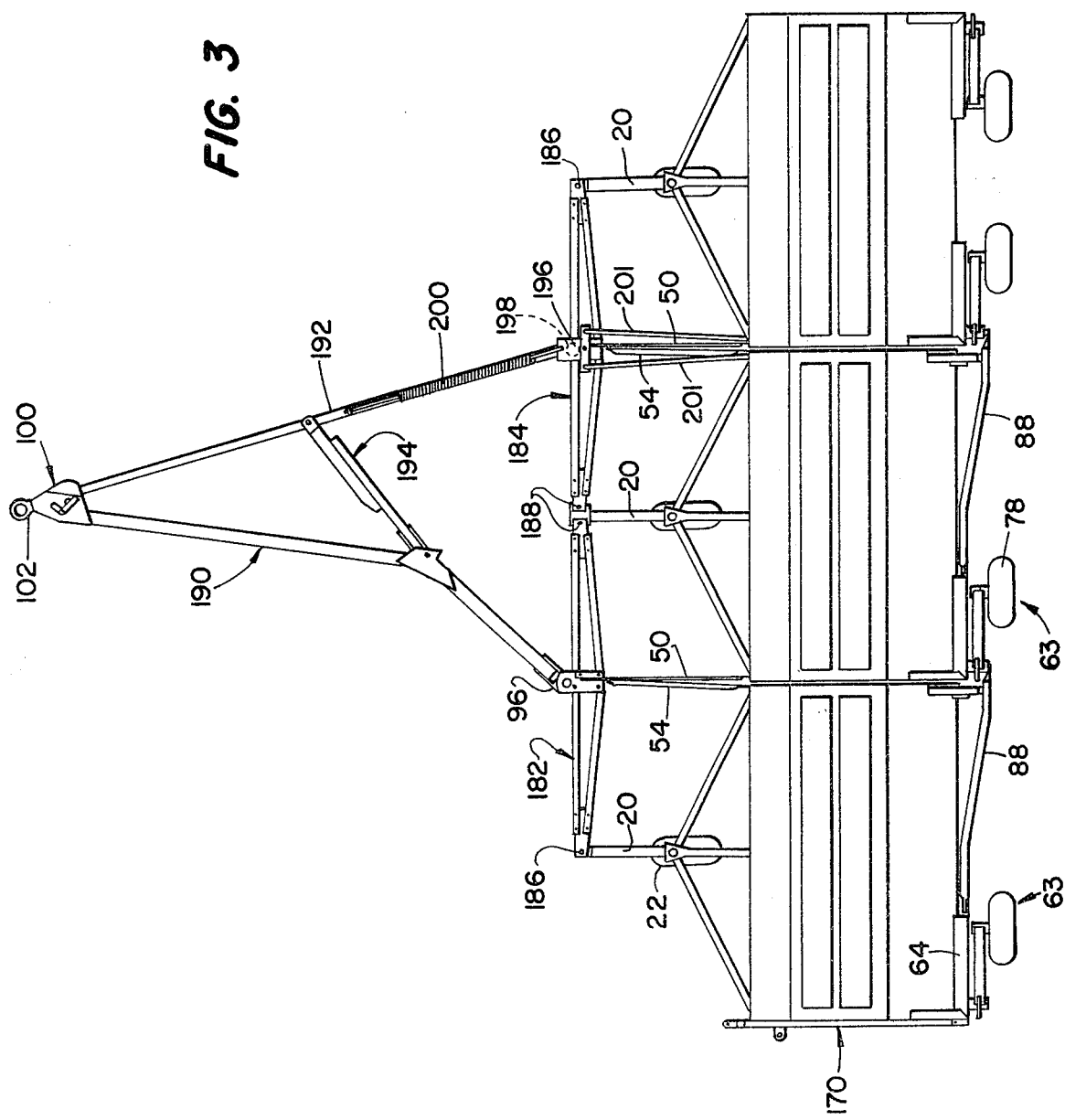
FIG. 3 is a plan view of a hitch towing three grain drills in the field-working position.

FIG. 3 shows a hitch for ganging three grain drills in which a pair of trusses 182 and 184 are connected by ball joints 186 and 188 to the hitch assemblies 20 of the drills. A main beam 190 is provided similar to the beam 90 shown in FIG. 1 and is connected in a similar manner to the left-most truss 182. A righthand rod 192 is connected to the truss 184 in a similar manner as that shown for rod 104 in FIG. 1, but angled slightly to the left toward the latch assembly 100. A drag link 194 is connected between the main beam 190 and the right-hand rod 192. A mast 196 extends upwardly from the pivotal connection 198 between the rod 192 and the truss 184. A balance spring 200 extends from the upward portion of the mast to the central portion of the rod 192 to provide float for the rod and aid in alignment of the hook end of the rod with the latch assembly 100. Support rods 201 stabilize the truss 184 horizontally, and the stabilizer bars and tubes 50 and 54 maintain the drills in alignment while allowing them to move vertically with respect to each other. The bar and tube 50 and 54 for the truss 182 stabilize it horizontally.

The operation of the transport hitch for the three unit arrangement as shown in FIG. 3 is similar to that for the unit shown in FIG. 1, with the exception that no telescoping tube similar to tube 108 is used.

In the field-working position the right-hand rod 192 in FIG. 3 will transfer more of the draft load of the towing vehicle to the trusses than will the rear portion of center rod in FIG. 1 which generally carries little of the load. With the three-unit hitch there is a tendency for the center drill unit to be pulled forwardly because two outer drills are pulling the outer ends of trusses 182 and 184 rearwardly while the center drill alone is opposing these forces. Therefore, the stabilizer bars and tubes 50 and 54 restrain the center drill from its tendency to move forwardly with respect to the other two drills.

From the above it can be seen that a relatively lightweight and flexible implement hitch is provided that can be easily converted from the forward field-working position to the endwise transport position without disconnecting the towing vehicle from the main beam. Individual frame or truss members connected by ball joints to the implement hitches eliminate a massive transverse beam and allow the units to move up and down relative to each other over rough terrain. Substantially all of the draft load is carried by the goosenecks or hitches of the individual implements with the stabilizer tubes and bars maintaining fore-and-aft alignment of the implements while allowing them to move up and down with respect to each other without damage to the forward corners of the implements. Since the implement frames themselves are used to mount sections of the hitch assembly there is no need for a hitch frame that completely surrounds the implements or which requires fore-and-aft frame members extending between the rear and the forward end of the hitch. The cam and lift bracket arrangement also eliminates the need for two pairs of rear transport wheels on each implement while prividing an automatic engaging and disengaging function which supports the corners of the frames at equal heights during transport and which allows the rear of the frames to move up and down freely with respect to each other while in the field-working position.

While specific embodiments have been shown and described for use with multiple grain drills, the same is to be considered as illustrative only and is not to restrict the invention beyond the scope of the appended claims.

We claim:

1. For a plurality of implements having forwardly extending towing connections, an implement transporting device for towing the implements in substantially a side-by-side fashion forwardly through a field and for towing the implements endwise during transport comprising:
   a plurality of truss members extending substantially transversely to the forward towing direction, each member having opposite ends connected to an adjacent pair of the towing connections, whereby the truss members transversely space the implements;
   means for pivotally connecting adjacent ends of the turss members and permitting the towing connections to move up and down with respect to each other;
   means connected between adjacent implements for maintaining fore-and-aft alignment of the implements;
   a hitch beam adapted for attachment to the towing vehicle and pivotally connected to an endmost truss member for pivoting between a forwardly extending field-working position for pulling the implements forwardly through the field, and a sideways transport position wherein the hitch beam extends outwardly beyond an endmost implement for pulling the implements in an endwise manner; and
   a plurality of wheel assemblies connected near the rear of the implements for raising and lowering the implements between first and second positions, the assemblies including wheels having substantially horizontal axes of rotation extending in the forward direction wherein in the first position the wheels are lowered against the ground to raise the implements for transportation in the endwise direction and in the second position the wheels are raised above the ground to allow the implement to contact the ground and move forwardly in the field-working position.

2. The device as set forth in claim 1 wherein the means pivotally connecting the ends of the truss members includes a pair of ball joints connected to the towing connections and to the respective adjacent ends.

3. The device as set forth in claim 1 wherein the wheel assemblies include means for automatically connecting the rear ends of the adjacent implements together as the implements are raised toward the first position and for disconnecting the adjacent implements as they are lowered toward the second position.

4. The device as set forth in claim 1 wherein the means for maintaining fore-and-aft alignment comprise first and second fore-and-aft elongated members having one of their ends connected to an adjacent pair of the imprements and connected near their opposite ends by a pivot, said opposite ends supported from the corresponding truss member connecting said adjacent pair of implements.

5. A transport hitch for ganging a plurality of implements each having a frame and a hitch connection for towing the implement forwardly through a field, the transport adapted for connection to a towing vehicle for towing the implements together in the field-working position and for towing the implements in an endwise fashion in a direction generally transverse to the forward direction, the hitch comprising:
   a plurality of generally horizontal transversely aligned support members extending between and connected to the hitch connections, the support members spacing the implements in a substantially side-by-side configuration for moving forwardly through the field;
   a beam member pivotally connected about a substantially vertical axis to one of the support members for pivoting between a forward field-working position and an endwise transport position;
   means for connecting the beam member to the towing vehicle;
   means connected to another one of the support members for releasably securing the beam member against pivoting about the axis while in the field-working position; and
   means for vertically moving the implements between first and second positions corresponding to the transport and field-working position, respectively, said means including for each adjacent pair of implements, transport wheel means mounted on one of the pair of implements near adjacent ends of their frames for movement between upper and lower positions corresponding to the field-working and transport positions, respectively, and engaging member operably connected to the transport wheel means for movement between a raised and a lowered position as the wheel means is moved between the upper and lower positions, respectively, and a bracket member connected to the other of the pair of implements and engageable by the engaging member as it is moved toward the raised position for raising the adjacent ends of the frames to substantially the same height.

6. The transport hitch as set forth in claim 5 wherein the transport wheel means includes an arm connected near the end of the frame for rocking in a generally vertical plane and the engaging member comprises a cam member connected for rocking with the arm, and wherein the bracket member is connected to the adjacent end of the adjacent frame and extends into the path of rocking of the cam member.

7. The hitch as set forth in claim 5 further comprising an elongated generally transverse connecting member extending between each adjacent pair of implements and having opposite ends pivotally connected to remote sections of the pair of implements for pivoting about generally horizontal fore-and-aft axes.

8. The hitch as set forth in claim 7 wherein one end of the connecting member is connected to one corner of one of the pair of implements and the other end is connected to the distal corner of the other one of the pair.

9. The hitch as set forth in claims 5 or 7 further comprising stabilizer means extending rearwardly from the support members and connected to the implements for maintaining fore-and-aft alignment of adjacent pairs of implements.

10. The hitch as set forth in claims 5 or 7 further comprising means for permitting relative vertical movement of opposite ends of each support member.

11. A hitch assembly for ganging plurality of implements, each implement having a frame with front and rear portions, the front portion carrying a hitch connection and a forward ground engaging caster wheel, the hitch assembly adapted for connecting to a towing vehicle for moving the ganged implements forwardly in a field-working position and for transporting the implements endwise in a transport position, the hitch assembly comprising;

first means transversely spacing the implements and maintaining them in a fore-and-aft alignment, said first means including transversely aligned truss members pivotally connected to the hitch connections on adjacent pairs of implements, means for stabilizing the implements in the fore-and-aft direction while allowing them to move up and down freely with respect to each other connected to the frames, and a transverse tie member extending between and having its ends pivotally connected to the rear frame portions on a pair of implements;

a beam having one of its ends connected to one of the truss members for pivoting about a vertical axis between a forwardly extending and an endwise extending position;

means for selectively securing the beam in either of the forward or endwise extending positions; and a plurality of wheel assemblies carried on the rear frame portion, each wheel assembly including a wheel mounted for rotation about a fore-and-aft extending axis and shiftable between ground-engaging and non-engaging positions corresponding to the transport and field-working positions, respectively.

12. The hitch assembly as set forth in claim 11 wherein the means for securing the beam includes a rod member pivotally connected at one end to another one of the truss members and selectively connectible at its other end to the other end of the beam.

13. The hitch assembly as set forth in claim 12 further comprising means for automatically latching the rod member to the beam as the beam is moved from the second to the first position.

14. The hitch assembly as set forth in claim 13 wherein the means for automatically latching the rod member to the beam comprises a hook connected to the other end of the rod member, a load-bearing pin member connected to the beam for receiving the hook, means for guiding the hook into engagement with the pin member as the beam is pivoted toward the forwardly extending position, and means for automatically locking the hook and the pin member in load-bearing relationship as the beam reaches the forwardly extending position.

15. The hitch assembly as set forth in claim 13 further comprising a link, first means for pivotally connecting the link to the beam and second means for pivotally connecting the rod member and the beam.

16. The hitch assembly as set forth in claim 15 wherein the first means includes a horizontal and a vertical pivot, and further includes means for locking the link against vertical movement about the horizontal pivot as the beam approaches the field-working position.

17. A hitch assembly for ganging a plurality of implements with frames, the implements having forward towing connections adapted for connection to a vehicle for pulling the implements forwardly through a field in a field-working position, the hitch comprising:

first means for transversely spacing the implements and maintaining them in fore-and-aft alignment connected to the towing connections:

a towing member pivotally connected to the first means for swinging in substantially a horizontal plane between a forward field-working position and an endwise transport position, the towing member including means for connecting the member to the towing vehicle extending radially outwardly from the pivotal connection whereby in the field-working position the means for connecting extends forwardly of the aligned implements and in the endwise transport position it extends outwardly in the transverse direction beyond an outermost implement;

means for raising the implements from a field-working to a transport position including a wheel assembly rearwardly of adjacent ends of each adjacent pair of the implements, the wheel assembly comprising an arm having one of its ends connected to one implement of the pair of implements for rocking between a raised and a lowered position, a wheel connected to the opposite end for rotation about a substantially fore-and-aft extending axis, a lift member operably connected to the arm for moving from an uncoupling to a coupling position as the arm is moved from the raised to the lowered position, means connected to the other of the pair of implements for engagements by the lift member as it is moved toward the coupling position.

18. A gang hitch assembly for ganging in side-by-side relationship a plurality of implements each having forwardly extending hitch means, the assembly comprising;

first means including a plurality of individual transversely extending frame units pivotally connected together extending between and connected to the hitch means of each adjacent pair of implements while permitting the hitch means to move up and down with respect to each other;

second means connected between the first means and implements for maintaining fore-and-aft alignment of the implements;

power operated vertically movable wheel means for raising and lowering the implements;

a hitch beam pivotally connected to the first means extending between an outermost pair of the implements for movement between a transport position in which a free end of the beam extend to an end of the side-by-side implements and a field-working position in which the free end of the beam extends forwardly of the implements;

a hitch rod having one end pivotally connected to another of the first means and having at its free end for connection to the beam adjacent its free end when the beam is in the field-working position.

19. The hitch assembly as set forth in claim 18 wherein the first means comprises a truss extending between each adjacent pair of implements and connected at its opposite ends to the hitch means of the pair, and wherein the second means includes first elongated member having one end connected to the one of the pair of implements and the opposite end secured against vertical movement with respect to the truss, and a second elongated member having one end connected to the other pair of implements and the opposite end pivotally connected to the first member in close proximity to the truss.

20. A gang hitch assembly for ganging in lateral alignment a plurality of implements each having a forwardly extending hitch means and each supported at a forward portion by a caster wheel; the assembly comprising:
- means extending between and connected to each adjacent pair of laterally aligned implements for maintaining lateral spacing between implements while affording relative vertical movement between adjacent implements;
- power operated vertically movable transport wheel means mounted on the rear of the implements to raise the implements on wheels rotatable about axis generally parallel to the direction of movement of the implements through the field, there being a single transport wheel means for the adjacent ends of each adjacent pair of implements mounted on one of the implements on the end adjacent the other of the pair of adjacent implements and an additional transport wheel means on the outer end of each of the outer of the laterally aligned implements;
- abutment means mounted on each of the other of each adjacent pair of implements near the adjacent end thereof;
- each transport wheel means for the adjacent ends of each adjacent pair of implements including engagement means movable in response to lowering movement of the wheel means relative to the implement for engaging the abutment means of the adjacent implement and maintaining the adjacent ends of the adjacent pair of implements at the same vertical level; and
- hitch means connected to the means for maintaining lateral spacing movable between and releasably lockable in a field-working position in which a free end extends forwardly of the laterally aligned implements and a transport position in which the free ends laterally beyond the outer end of one of the outer of the laterally aligned implements.

21. A hitch for ganging at least first, second and third implements having forwardly extending hitch connections for towing the implements forwardly through a field, the hitch comprising:
- a first transversely extending truss connected between the hitch connections for the first and second implements and a second transversely extending truss connected between the connections for the second and third implements, said trusses positioning the implements end-to-end for broadside movement forwardly through the field;
- a beam pivotally connected to the first truss for swinging between a field-working position and an endwise transport position, wherein in the field-working position the beam extends forwardly of the second implement and in the transport position the beam extends outwardly beyond the side of the first implement;
- a rod member pivotally connected to the second truss member for rocking between a forwardly extending field-working position and a transversely extending transport position;
- link means connected between the beam and the rod member for pivoting the latter between the transport and forwardly extending positions as the beam is swung between the endwise transport and field-working positons, respectively;
- releasable latch means connecting the rod member and the beam for preventing the latter from swinging when in the field-working position;
- means for selectively securing the beam in the transport position;
- a plurality of transport wheels connected to the implement and having axes of rotation extending generally parallel to the forward field-working direction; and
- means for raising the implements on the transport wheels for endwise movement to and from the field.

22. The hitch as set forth in claim 21 further comprising means for restraining relative fore-and-aft movement of adjacent ends of adjacent implements while allowing relative vertical movement of the adjacent ends.

23. The hitch as set forth in claims 21 or 22 further comprising for each adjacent pair of implements an elongated transversely extending spacing member, means for pivotally connecting the one end of the spacing member to the rear of one of the pair of implements and the opposite end to the rear of an adjacent implement to allow adjacent rear corners of the implements to move vertically with respect to each other while maintaining the desired end-to-end spacing of the implements.

24. The hitch as set forth in claims 21 or 22 further comprising a ball joint connecting each end of each truss to a corresponding hitch connection.

25. The hitch as set forth in claim 22 wherein the means for restraining relative fore-and-aft movement comprises a first bar member pivotally connected to a forward end portion of an implement and a second bar member pivotally connected to an adjacent forward end portion of an adjacent implement, the bar members extending forwardly from the implements in the direction of one of the trusses and connected near their ends remote from the implements by a transverse pivot, and means for supporting the bar members from said one of the trusses.

26. The hitch as set forth in claim 25 further comprising means for restraining the remote end of one of the bar members against relative vertical movement with respect to the truss while allowing relative fore-and-aft movement of the bar member and the truss.

27. The hitch as set forth in claim 26 wherein the means for restraining also maintains the truss in a substantially horizontal attitude.

28. The hitch as set forth in claim 21 wherein the latch means is secured near the forward end of the beam and engages the forward end of the rod member as the beam is swung toward the field-working position, and wherein the hitch further comrises means for vertically stabilizing the link means as the beam is swung toward the field-working position.

29. The hitch as set forth in claims 21 or 28 wherein in the link means includes a channel member for receiving the rod member as the beam is pivoted to the transport position.

30. The hitch as set forth in claim 21 further comprising a telescoping tube pivotally connected at one end to the gang near the third implement and at the other end to the central portion of the rod member and means for securing the tube against telescoping when the rod member is in the forwardly extending transport position.

31. For a plurality of implements having forwardly extending towing connections, an implement transporting device for towing the implements in substantially a side-by-side fashion forwardly through a field and for towing the implements endwise during transport comprising:

a plurality of truss members extending substantially transversely to the forward towing direction, each member having opposite ends connected to an adjacent pair of the towing connections, whereby the truss members transversely space the implements;

means connected between adjacent implements for maintaining fore-and-aft alignment of the implements;

a hitch beam adapted for attachment to the towing vehicle and pivotally connected to an endmost truss member for pivoting between a forwardly extending field-working position for pulling the implements forwardly through the field, and a sideways transport position wherein the hitch beam extends outwardly beyond an endmost implement for pulling the implements in an endwise manner;

a plurality of wheel assemblies connected near the rear of the implements for raising and lowering the implements between first and second positions, the assemblies including wheels having substantially horizontal axes ofrotation extending in the forward direction wherein in the first position the wheels are lowered against the ground to raise the implements for transportation in the endwise direction and in the second position the wheels are raised above the ground to allow the implement to contact the ground and move forwardly in the field-working position; and means pivotally connecting the ends of the truss members to the towing connections.

32. For a plurality of implement shaving forwardly extending towing connections, an implement transporting device for towing the implements in substantially a side-by-side fashion forwardly through a field and for towing the implements endwise during transport comprising:

a plurality of truss members extending substantially transversely to the forward towing direction, each member having opposite ends connected to an adjacent pair of the towing connections, whereby the truss members transversely space the implements;

means connected between adjacent implements for maintaining fore-and-aft alignment of the implements;

a hitch beam adapted for attachment to the towing vehicle and pivotally connected to an endmost truss member for pivoting between a forwardly extending field-working position for pulling the implements forwardly through the field, and a sideways transport position wherein the hitch beam extends outwardly beyond an endmost implement for pulling the implements in an endwise manner;

a plurality of wheel assemblies connected near the rear of the implements for raising and lowering the implements between first and second positions, the assemblies including wheels having substantially horizontal axes of rotation extending in the forward direction wherein in the first position the wheels are lowered against the ground to raise the implements for transportation in the endwise direction and in the second position the wheels are raised above the ground to allow the implement to contact the ground and move forwardly in the field-working position; and wherein the wheel assemblies include means for automatically connecting the rear ends of the adjacent implements together as the implements are raised toward the first position and for disconnecting the adjacent implements as they are lowered toward the second position.

33. A gang hitch assembly for ganging in side-by-side relationship, a plurality of implements each having forwardly extending hitch means, the assembly comprising;

first means extending between and connected to the hitch means of each adjacent pair of implements for maintaining spacing between the adjacent pairs of implements;

second means connected between the first means and implements for maintaining fore-and-aft alignment of the implements;

power operated vertically movable wheel means for raising and lowering the implements;

a hitch beam pivotally connected to the first means extending between an outermost pair of the implements for movement between a transport position in which a free end of the beam extends to an end of the side-by-side implements and a field-working position in which the free end of the beam extends forwardly of the implements;

a hitch rod having one end pivotally connected to another of the first means and having means at its free end for connection to the beam adjacent its free end when the beam is in the field-working position; and wherein the first means comprises a truss extending between each adjacent pair of implements and connected at its opposite ends to the hitch means of the pair, and wherein the second means includes first elongated member having one end connected to the one of the par of implements and the opposite end secured against vertical movement with respect to the truss, and a second elongated member having one end connected to the other of the pair of implements and the opposite end pivotally connected to the first member in close proximity to the truss.

34. For a plurality of implements having forwardly extending towing connections, an implement transporting device for towing the implements in substantially a side-by-side fashion forwardly through a field and for towing the implements endwise during transport comprising:

a plurality of individual frame units extending substantially transversely to the forward towing direction, each member having opposite ends connected to an adjacent pair of the towing connections, whereby the frame units transversely space the implements;

means connected between adjacent implements for maintaining fore-and-aft alignment of the implements comprising first and second fore-and-aft extending members having one of their ends connected to an adjacent pair of implements and having their opposite ends pivotally connected together and supported from the frame unit spacing said adjacent pair;

a hitch beam adapted for attachment to the towing vehicle and pivotally connected to an endmost frame unit for pivoting between a forwardly extending field-working position for pulling the implements forwardly through the field, and a sideways transport position wherein the hitch beam extends outwardly beyond an endmost implement for pulling the implements in an endwise manner;

a plurality of wheel assemblies connected near the rear of the implements for raising and lowering the implements between first and second positions, the assemblies including wheels having substantially horizontal axes of rotation extending in the forward direction wherein in the first position the wheels are lowered against the ground to raise the implements for transportation in the endwise direction and in the second position the wheels are raised above the ground to allow the implement to contact the ground and move forwardly in the field-working position.

35. The device as set forth in claim 34 further comprising means for pivotally connecting the ends of the frame units to the towing connections.

* * * * *

UNITED STATES PATENT AND TRADEMARK OFFICE
CERTIFICATE OF CORRECTION

PATENT NO. : 4,260,172

DATED : 7 April 1981

INVENTOR(S) : Vernon E. Rettig and John R. Myers

It is certified that error appears in the above—identified patent and that said Letters Patent is hereby corrected as shown below:

Column 9, line 65, delete "imprements" and insert -- implements --.

Column 12, line 38, after "implements", insert -- for maintaining spacing between the adjacent pairs of implements --; line, 49, change "extend" to "extends"; line 54, after "having" insert -- means --.

Column 13, line 40, change "ends" to "end" and insert -- extends -- before "laterally"

Column 14, line 55, delete "comrises" and insert -- comprises --.

Column 15, line 39, change "shaving" to "having".

Signed and Sealed this

Eighteenth Day of May 1982

[SEAL]

Attest:

GERALD J. MOSSINGHOFF

Attesting Officer

Commissioner of Patents and Trademarks